(No Model.) 3 Sheets—Sheet 1.
W. J. LINDSAY.
SAW FILING MACHINE.
No. 392,738. Patented Nov. 13, 1888.
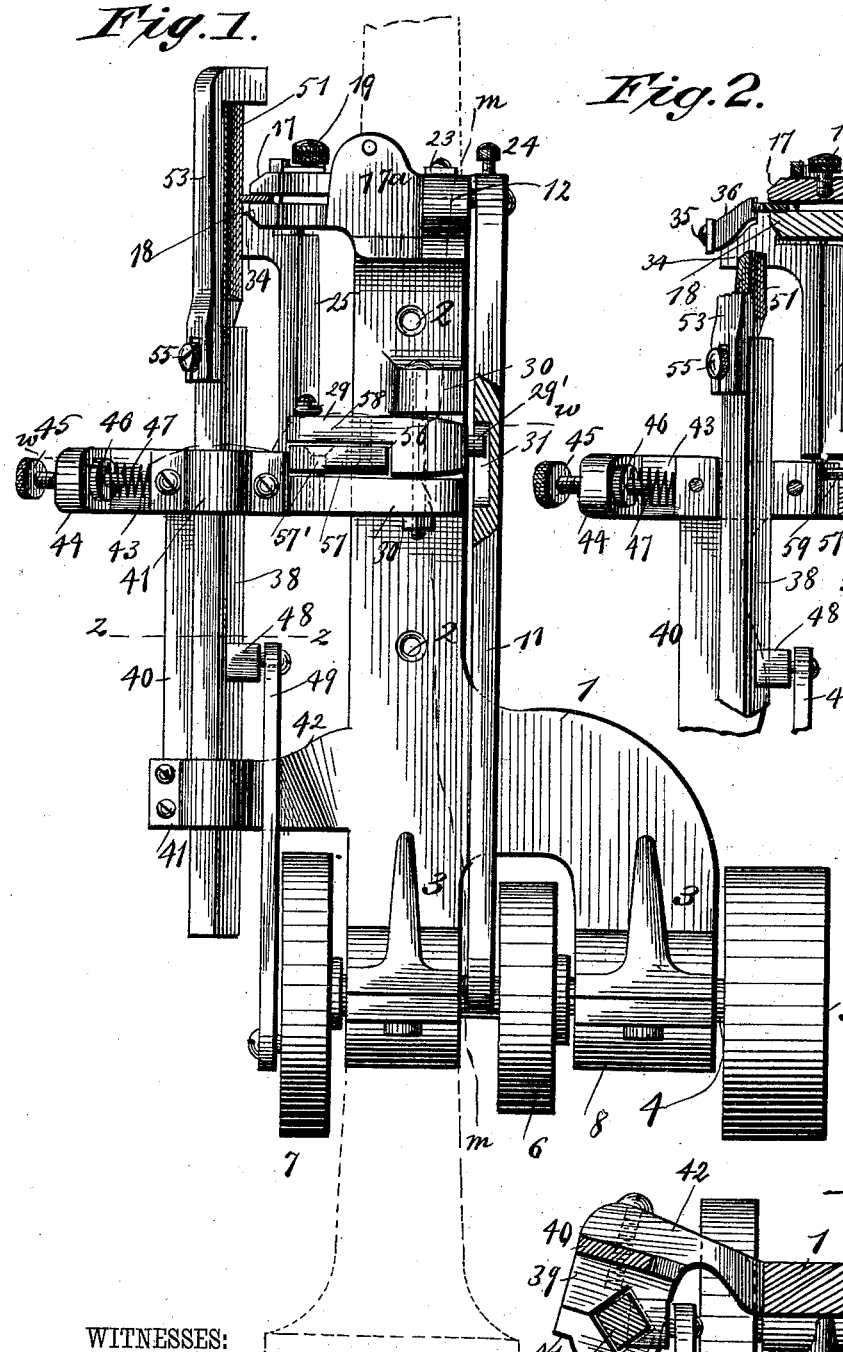
Fig. 1.
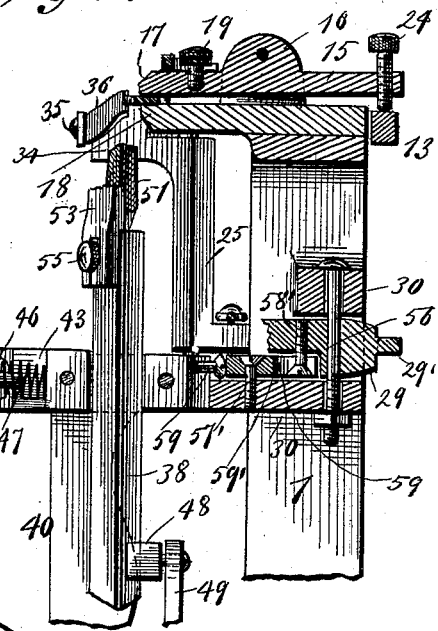
Fig. 2.
Fig. 3.
WITNESSES:
Phil. C. Dietrich.
C. Sedgwick.
INVENTOR:
W. J. Lindsay.
BY Munn & Co.
ATTORNEYS.
N. PETERS, Photo-Lithographer, Washington, D. C.

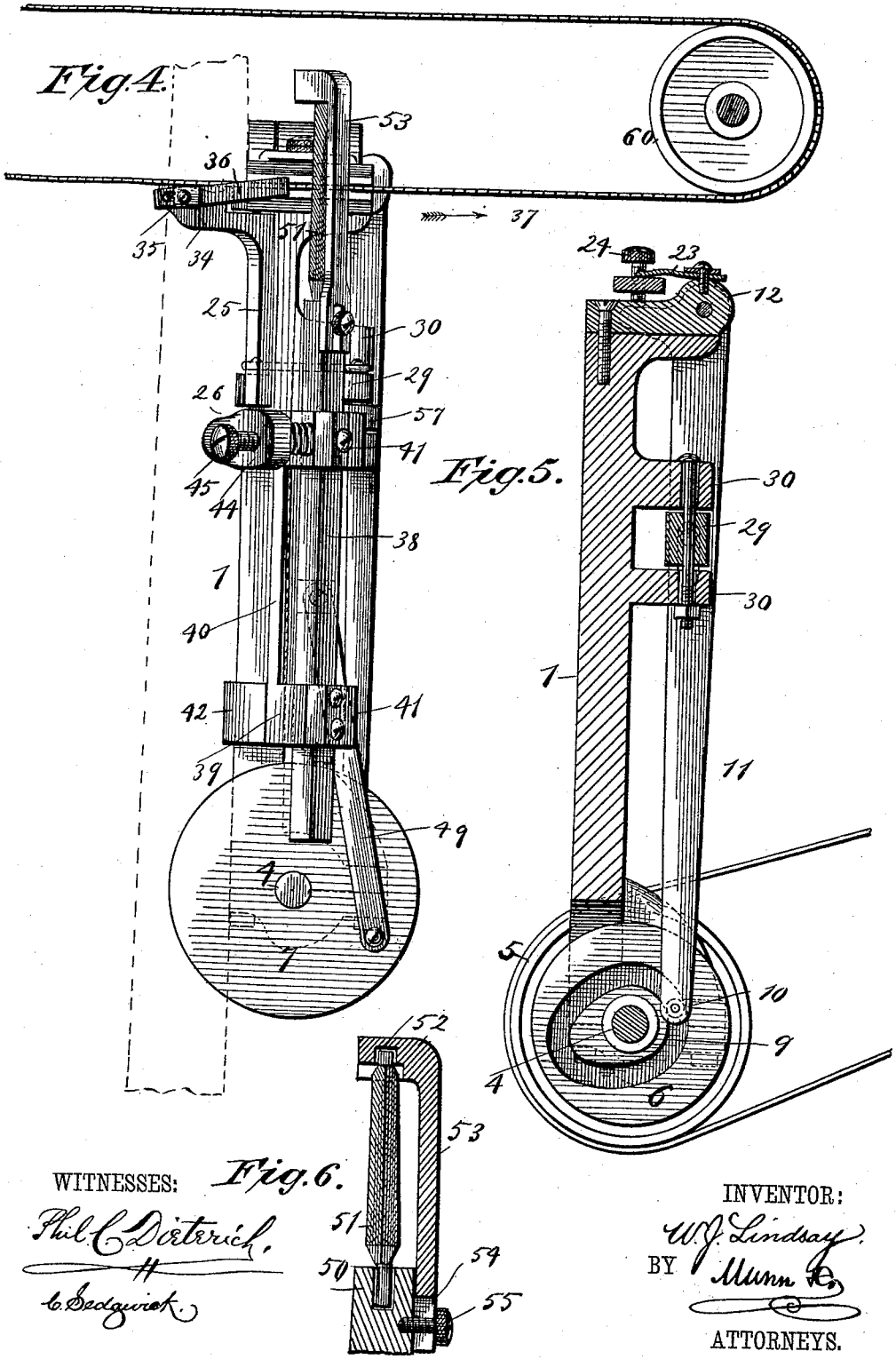

(No Model.) 3 Sheets—Sheet 3.

W. J. LINDSAY.
SAW FILING MACHINE.

No. 392,738. Patented Nov. 13, 1888.

WITNESSES:
Phil. C. Dieterich
C. Sedgwick

INVENTOR:
W. J. Lindsay
BY Munn & Co
ATTORNEYS.

United States Patent Office.

WILLIAM J. LINDSAY, OF OTTUMWA, IOWA.

SAW-FILING MACHINE.

SPECIFICATION forming part of Letters Patent No. 392,738, dated November 13, 1888.

Application filed February 21, 1888. Serial No. 264,719. (No model.)

*To all whom it may concern:*

Be it known that I, WILLIAM J. LINDSAY, of Ottumwa, in the county of Wapello and State of Iowa, have invented a new and Improved Saw-Filing Machine, of which the following is a full, clear, and exact description.

This invention relates to an improvement in machines for filing saws, and has especial reference to a machine adapted to file band-saws.

The invention has for its object to provide a machine by means of which no injury can be done to the saw or to the file, and every tooth on the saw will be cut to the same depth, and also in which the several operating parts of the machine are automatically adjusted.

The invention embraces in its construction a mechanism for reciprocating a file and moving it away from the tooth in one direction of its movement and a mechanism for simultaneously unclamping and conveying the saw forward and then clamping the same, all constructed and arranged as will be hereinafter described and claimed.

Reference is to be had to the accompanying drawings, forming a part of this specification, in which similar figures of reference indicate corresponding parts in all the figures.

Figure 7:
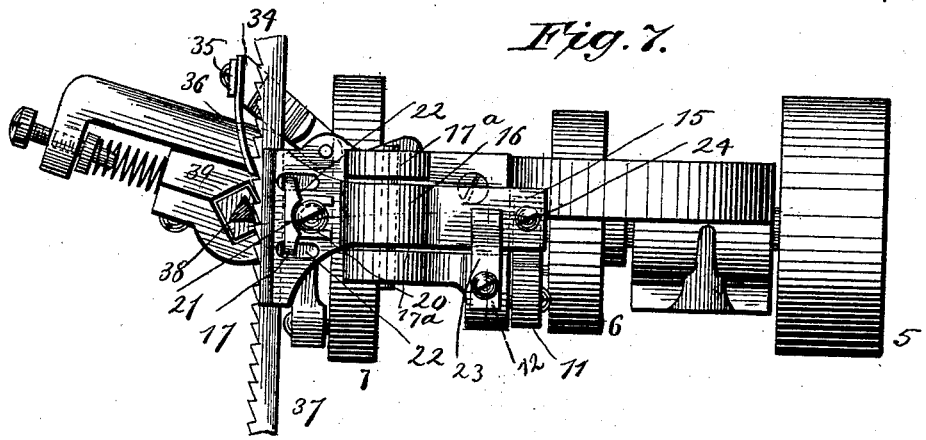
Figure 8:
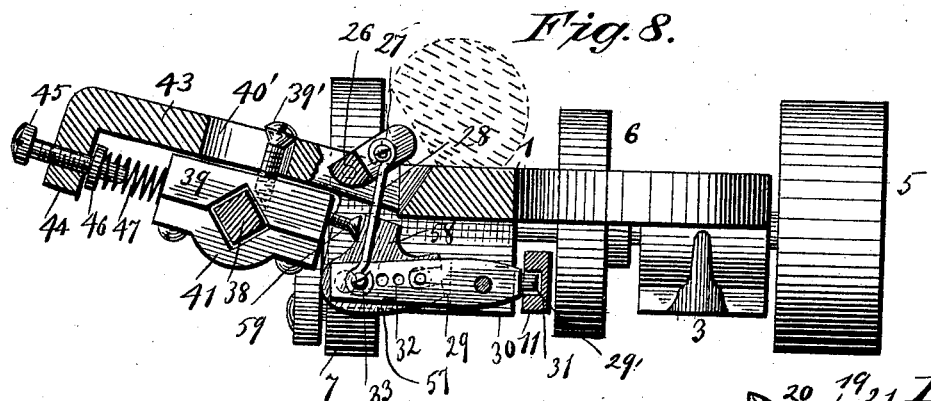
Figures 9, 10:
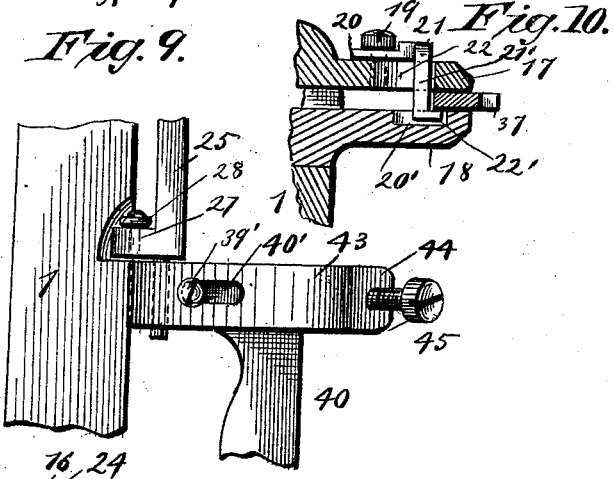
Figure 11:
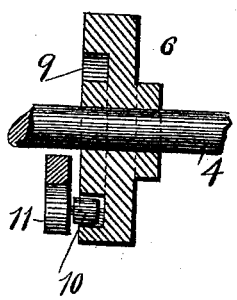
Figure 12:
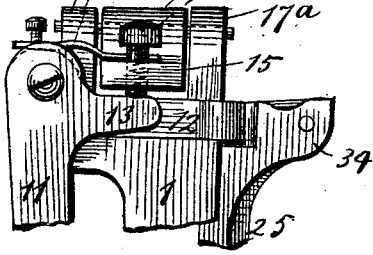

Figure 1 represents a side view of the machine, partly in section. Fig. 2 is a detail view, with parts broken away and parts in section, of the upper portion of the machine. Fig. 3 is a detail view, with parts in section and parts broken away, through the line $z\ z$ of Fig. 1. Fig. 4 is a front view of the machine. Fig. 5 is a vertical section on the line $m\ m$ of Fig. 1. Fig. 6 is a detail view, in vertical section, of the parts holding the file in position. Fig. 7 is a plan view of the machine. Fig. 8 is a horizontal section on the line $w\ w$ of Fig. 1. Fig. 9 is a detail view, with parts broken away, of a portion, showing one of the brackets for the file-holder vibrating frames. Fig. 10 is a detail view, with parts broken away and parts in section, of a portion of the saw-clamp. Fig. 11 is a detail view in section, with parts broken away, of the cam-operating wheel; and Fig. 12 is a detail view with parts broken away, showing the rear of the top of the machine.

In the construction of this invention a main or vise frame, 1, is employed, which is mounted on any suitable support, and, as here shown, is provided with perforations 2, by means of which it may be secured to a post, as shown in dotted lines in Fig. 1. The main frame 1 is formed at its lower end with bracket-hangers 3 3, in which a shaft, 4, carrying a band-wheel, 5, and the driving-wheels 6 and 7, is supported by means of cap-pieces 8, secured to the brackets 3 by screws 4.

The driving-wheel 6 is formed with a cam-shaped slot, 9, in one of its sides, in which rests and is adapted to move a pin, 10, on the lower end of a vibrating bar, 11, pivoted to a bracket, 12, at the top of the frame 1. The upper end of the vibrating bar 11 is formed with a short arm, 13, which bears against the end of a set-screw, 24, in the arm 15 of the saw-clamp 16, pivoted in standards 17ª on the top of the main frame. The front end of the saw-clamp 16 is formed with a widened portion, 17, which is adapted to bear against a corresponding portion, 18, on the top of the main frame. The end 17 of the clamp 16 is provided with an adjusting-screw, 19, the head of which screw 19 bears on the projections 20 of a bar, 21, having portions 21' projecting downward through slots 22 in the broadened end 17, and having bent ends 22' located in slots 20' in the lower portion, 18. This device serves as a guide for the saw being filed, and may be adjusted for saws of different widths. The rear edge of the saw being filed rests on the ends 22' and is adapted to move over them.

To the bracket 12 is secured a spring, 23, which bears against the arm 15 of the pivoted clamp 16 and aids in throwing up the end 17 thereof. The throw of the clamp 16, by means of the arm 13 and vibrating arm 11, is regulated by adjusting the screw 24. The pin 10 is provided with a friction-roller to permit easy movement of the parts. By means of the construction above described it will be seen that an intermittent movement will be given to the pivoted clamp 16.

In order to feed the saw between the ends 17 and 18 simultaneously with the opening movement of the clamp 16, the following device is employed: At one corner of the lower portion, 18, is pivoted one end of a vibrating bar, 25, having its other end pivoted in a bracket, 26, projecting from the main frame, and having an arm, 27, connected, by means of a rod, 28, with a lever, 29, pivoted between bracket-arms 30 of the main frame, its rear end having a projection, 29', located in a slot, 31, in the vibrating arm 11, and the end of the rod 28 being adjustably connected with the lever 29 by means of a series of perforations, 32, therein, adapted to receive a pin, 33, engaging the end of the rod 28.

The upper end of the vibrating bar 25 is formed with a projection or arm, 34, adjacent to the end 17 of the clamp 16, to which arm 34 is secured by means of a screw, 35, a pushing-arm, 36, curved, as shown, and projecting in front of the clamping ends 17 and 18, so as to be thrown into engagement with the teeth of a band-saw, 37, clamped between the portions 17 and 18.

In order to operate the file, a reciprocating bar, 38, is mounted in bracket-arms 39 on a vertical bar, 40, and held in place by means of cap-plates 41, as shown. The lower end of the bar 40 is pivoted to a bracket, 42, on the main frame, and the upper vibrating end of the bar 40 slides against the bracket 43 on the main frame, having angular projecting arm 44, through which passes a set-screw, 45, having a washer, 46, between which and the bracket 39 is located a coiled spring, 47, acting by its tension to normally hold the bar 40 toward the main frame. The reciprocating bar 38 is formed with a lug, 48, to which is pivoted a crank-arm, 49, pivoted at its lower end eccentrically to the wheel 7. The upper end of the reciprocating bar 38 is formed with a recess, 50, to receive the lower end of a file, 51, the upper end thereof resting in a recess, 52, in a bracket-bar, 53, having its slotted lower end, 54, adjustably secured to the reciprocating bar 38 by means of a set-screw, 55.

In the upward movement of the reciprocating bar 38 the file 51 will abut by the action of the spring 47 against the saw 37 and file the teeth. In order that the file shall not bear against the saw in its downward movement, the following mechanism is employed: The lever 29 is formed with a recess, 56, in which is located a block, 57, eccentrically pivoted by means of a pin, 57', to bracket 30, and having an arm, 58, bearing against a set-screw, 59, on the bracket 39. The block 57 is operated by means of a pin, 58', in the lever 29 moving in a slot, 59', in the block 57. By means of this construction in the vibration of the lever 29 the arm 58 will be caused to act against the set-screw 59 and bracket 39 to move the same with the bar 40 backward away from the main frame, and will thereby move the file 51 and the reciprocating bar 38 away from the saw 37. The upper end of the bar 40 is guided by a screw-pin, 39', passing through a slot, 40', in the bracket 43. If desired, the band-saw 37 may be mounted on pulleys 60, so as to be guided in its passage through the clamps 17 and 18.

In the operation of this device the band-saw 37 is clamped between the jaws 17 and 18, the set-screw 19 permitting of guiding any sized saw between the jaws 17 and 18. The band-wheel 5 is connected by a band (not shown) to any suitable driving-power. The parts being in the position shown in Fig. 1, upon setting the band-wheel 5 in operation the wheel 7 and crank-bar 49 will carry the reciprocating bar 38 upward, and with it the file 51, the spring 47 holding the file against the saw 37 to file the same. During this movement the vibrating pin 10 remains in the circular portion of the cam-slot 9, and there is no movement from the vibrating arm 11. Upon the further rotation of the band-wheel 5 the reciprocating bar 37 and file 51 commence to descend and the cam-slot 9 acts upon the pin 10 to vibrate the arm 11, moving the arm 13 away from the set-screw 24 in the arm 15, and thereby enabling the spring 23 to act on the arm 15 to depress the same and raise the forward end, 17, of the clamp 16. Simultaneously therewith the vibrating arm 11 acts upon the rear end of the lever 29 to vibrate the bar 35 and thereby move the arm 36, engaging a tooth of the saw 37, forward, which pushes the saw 37 forward the distance of a tooth and presents a new tooth to the file 51 to be ground, and at the same time the file has been moved away from the saw by the action of the block 57 on the bracket 39. On the further rotation of the wheel 6 the cam 9 acts on the pin 10 to vibrate the arm 11 and to cause the arm 13 to lift the arm 15 of the clamp 16 and press its forward end, 17, against the saw 37 and clamp it tightly to the portion 18. At the same time the movement of the wheel 7 and the reciprocating bar 38 is such as to carry the file 51 up against the saw 37. The action of the block 57 meanwhile has been such as to withdraw the arm 58 and permit the spring 47 to press the file 51 against the saw 37.

By means of the construction and arrangement of parts hereinbefore described a saw may be automatically fed forward and be held clamped securely in position when the file is operating on the saw, and the file may be withdrawn from the latter when not so operating.

The pressure of the file against the saw may be regulated by the adjustable spring. The file is rendered durable and has an even pressure and steady movement, and saws are quickly and effectively sharpened.

Having thus described my invention, I claim as new and desire to secure by Letters Patent—

1. A saw-filing machine constructed with a main driving-shaft, a vibrating lever having a pin at one end engaging a cam-slot in a wheel on the main shaft and a short arm at its other end, a pivoted saw-clamp having its rear end projecting over the short arm of the vibrating lever, a spring on the main frame bearing against the rear end of saw-clamp, a pivoted vertical bar having an arm at its upper end provided with a pusher-bar projecting in front of the saw-clamp and an arm at its lower end with a connecting-rod pivoted to a lever having a projecting end engaging a slot in the vibrating lever connected with the cam-wheel, a pin engaging a slot in an eccentric-block pivoted to a bracket on the main frame, and a vibrating frame pivoted to the main frame and carrying a reciprocating file-holder connected by a crank-bar with a wheel on the main shaft, the vibrating frame having a spring bearing against it in one direction and the eccentric-block bearing against it in the opposite direction, substantially as described.

2. In a saw-filing machine, the combination, with vibrating pivoted lever 11, having pin 10 engaging slotted cam-wheel 6 on main shaft 4, of rotary pivoted rod 25, having arm 34, with pusher-bar 36 and arm 26, connecting-rod 28, lever 29, eccentric-block 57, having slot 59' engaging pin 57' on lever 29, and the lever 29, having projection 29' engaging slot 31 in lever 11, substantially as described.

3. In a saw-filing machine, the combination, with pivoted clamp 16, having arm 15, with adjusting-screw 24, of frame 1, having broadened projection 18, and spring 23, and lever 11 pivoted thereto, with arm 13 beneath arm 15, and pin 10, engaging slotted cam-wheel 6 on driving-shaft 4, substantially as described.

4. In a saw-filing machine, the combination, with projection 18, having slots 20' on frame 1, of pivoted clamp 16, having a saw-blade guide consisting of bar 21, with arms 21' projecting through slots 22, and having bent ends 22', located in slots 20', and arms 20, with set-screw 19, substantially as described.

5. In a saw-filing machine, the pivoted vibrating frame 40, having reciprocating file-holder 38, connected by crank-bar 49 with driving-wheel 7 on shaft 4, the upper end of frame 40 having guide-pin 39', located in slot 40' of bracket-arm 43, in combination with spring 47, set-screw 45 in arm 44 of bracket 43, and disk 46 on screw 45, substantially as described.

6. The combination, with a fixed jaw, of a pivoted jaw, a pusher-arm and a pivoted bar carrying said arm, the intermediate lever, 29, a cam-operated lever acting on the pivoted jaw and said lever 29, a pivoted file-carrying frame and means for reciprocating said frame, and the pivoted block 57, substantially as shown and described.

7. A saw-filing machine constructed with main frame 1, having driving-shaft 4, with slotted cam-wheel 6 and driving-wheel 7, the pivoted saw-clamp 16, having arm 15, the spring 23, pressing on arm 15, the vibrated lever 11, with arm 13 beneath arm 15, and pin 10, engaging cam-wheel 6, the rotary bar 25, having pusher-bar 36 and connected by rod 28 with lever 29, having projection 29' engaging slot 31 in lever 11, and eccentric-block 57, with arm 58, operated by lever 29, in combination with vibrating pivoted frame 40, carrying reciprocating file-holder 38, with adjustable file-holding bracket 53, and crank-bar 49, connected with wheel 7, and bracket 43, having adjustable spring 47, bearing against the upper end of pivoted frame 40, substantially as described.

WILLIAM J. LINDSAY.

Witnesses:
JOHN SHOCKLEY,
GEO. GRISWOLD.